United States Patent
Glora et al.

(10) Patent No.: US 7,059,999 B2
(45) Date of Patent: Jun. 13, 2006

(54) METHOD AND DEVICE FOR CONTROLLING THE DRIVE UNIT OF A VEHICLE

(75) Inventors: Michael Glora, Markgroeningen (DE); Christian Muehlbauer, Echterdingen (DE); Mario Kustosch, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 10/490,445

(22) PCT Filed: Feb. 3, 2003

(86) PCT No.: PCT/DE03/00290

§ 371 (c)(1),
(2), (4) Date: Mar. 24, 2004

(87) PCT Pub. No.: WO2004/016923

PCT Pub. Date: Feb. 26, 2004

(65) Prior Publication Data

US 2004/0248696 A1 Dec. 9, 2004

(30) Foreign Application Priority Data

Jul. 24, 2002 (DE) .................. 102 33 576

(51) Int. Cl.
*F16H 59/74* (2006.01)
*B60W 10/04* (2006.01)
*G05G 1/14* (2006.01)

(52) U.S. Cl. .............. 477/110; 477/187; 477/905; 74/514

(58) Field of Classification Search .......... 477/110, 477/120, 186, 187, 902, 904, 905; 74/513, 74/514
See application file for complete search history.

(56) References Cited

U.S. PATENT DOCUMENTS

| | | | |
|---|---|---|---|
| 5,012,418 A | 4/1991 | Petzold | |
| 5,465,208 A | 11/1995 | Akuzawa et al. | |
| 5,669,847 A | 9/1997 | Kashiwabara | |
| 6,068,574 A * | 5/2000 | Wild et al. | 477/110 |
| 6,216,075 B1 * | 4/2001 | Speicher et al. | 477/37 |
| 6,223,111 B1 * | 4/2001 | Cronin et al. | 477/120 |
| 6,879,900 B1 * | 4/2005 | Henneken et al. | 477/120 |
| 2001/0008989 A1 | 7/2001 | Kurata et al. | |
| 2004/0249533 A1 * | 12/2004 | Wheals et al. | 701/44 |

FOREIGN PATENT DOCUMENTS

WO  WO 01 47735  7/2001

* cited by examiner

*Primary Examiner*—Roger Pang
(74) *Attorney, Agent, or Firm*—Walter Ottesen

(57) ABSTRACT

A method and an arrangement for controlling the drive unit of a vehicle are suggested which prevent a lost motion and a dead path in the interpretation of the position of the accelerator pedal for forming a desired acceleration. An acceleration command is derived from a position of an operator-controlled element (1), especially of an accelerator pedal, and a desired value for an output quantity of the drive unit is formed in dependence upon the acceleration command. A minimum value and/or a maximum value for the acceleration of the vehicle is determined in dependence upon an instantaneous running resistance. The minimum value and/or the maximum value are assigned to respective boundaries of an adjustment range for the position of the operator-controlled element (1).

15 Claims, 2 Drawing Sheets

METHOD AND DEVICE FOR CONTROLLING THE DRIVE UNIT OF A VEHICLE

RELATED APPLICATION

This application is the national stage of PCT/DE 03/00290, filed Feb. 3, 2003, designating the United States and claiming priority from German patent application no. 102 33 576.1, filed Jul. 24, 2002, the entire contents of which are incorporated herein by reference.

FIELD OF THE INVENTION

The invention proceeds from a method and from an arrangement for controlling the drive unit of a vehicle in accordance with the class of the independent claims.

BACKGROUND OF THE INVENTION

The acceleration establishes itself as a central quantity for the control of the vehicle longitudinal movement in networked drive systems. Applications such as vehicle speed control or drive dynamic control utilize already an acceleration input. The acceleration input by the driver via a conventional accelerator pedal is problematic in that the rest position of the accelerator pedal as well as the upper stop of the accelerator pedal cannot be clearly assigned to an acceleration input without a lost motion occurring, that is, a pedal travel without effect on the engine from the pedal rest position or a dead path arising, that is, a pedal travel without further action upon propulsion in the upper pedal region. Lost motion or dead path are experienced as uncomfortable by the driver. The following example will make this subject matter clear.

The acceleration input via the accelerator pedal is linearly interpolated from the position 0 starting with the value 0 $m/s^2$ up to the upper pedal stop at the value 4 $m/s^2$. For the description of the lost motion, it is assumed that the vehicle is accelerated downhill by the gravitational force, for example, at 0.8 $m/s^2$. This means that the driver must move the accelerator pedal up to the angle to which 0.8 $m/s^2$ is assigned before a vehicle reaction occurs. With respect to the dead path, it is assumed that the vehicle is braked uphill by the gravitational force, for example, likewise at 0.8 $m/s^2$. Because of this, the vehicle can achieve no acceleration of 4 $m/s^2$ at maximum engine power; rather, only a value of 3.2 $m/s^2$ can be reached. This means that the driver does not perceive any further vehicle reaction starting from the pedal angle to which 3.2 $m/s^2$ is assigned.

SUMMARY OF THE INVENTION

The method of the invention and the arrangement of the invention for controlling the drive unit of a vehicle have the advantage over the above that in dependence upon an instantaneous running resistance, a minimum value and/or a maximum value for the acceleration of the vehicle is determined and that the minimum value and/or the maximum value are assigned in each case to a limit of a positioning region for the position of the operator-controlled element. In this way, the positioning region for the position of the operator-controlled element can be made current in dependence upon the instantaneous running resistance in such a manner that neither lost motion nor dead path occur when an acceleration command is inputted via the accelerator pedal. In this way, the driving comfort is increased.

Advantageous further embodiments and improvements of the method given in the main claim are possible via the measures set forth in the dependent claims.

It is especially advantageous when an unknown component of the running resistance is derived with the aid of a driving dynamic equation in dependence upon: an instantaneous drive force of the vehicle; a known component of the running resistance; and, an instantaneous vehicle acceleration. In this way, the instantaneous running resistance can be determined very precisely while considering a known component of the running resistance as well as while considering the unknown component thereof. This makes possible also a precise determination of the minimum value and/or of the maximum value for the acceleration of the vehicle. Lost motion and dead path can be avoided still better in this way.

It is also advantageous when the unknown component of the running resistance is filtered especially by means of a lowpass. In this way, oscillations, which result with the determination of the unknown component, can be substantially eliminated.

It is especially advantageous when the minimum value of the acceleration is determined from a drive force of the vehicle less the instantaneous running resistance with this drive force being determined by an instantaneous drag torque. In this way, the minimum value of the acceleration corresponds essentially to the vehicle acceleration actually occurring when the accelerator pedal is released. In this way, the described lost motion can be substantially avoided with the input of the acceleration command via the accelerator pedal.

A further advantage is that the maximum value of the acceleration is determined from a maximum drive force less the instantaneous running resistance with this maximum drive force being determined by the instantaneous operating point of the vehicle. In this way, the maximum value of the acceleration essentially corresponds to the vehicle acceleration reached maximally at the instantaneous operating point of the vehicle. In this way, the dead path can be avoided in the region of the upper accelerator pedal stop when the acceleration command is inputted via the accelerator pedal.

It is especially advantageous when, in the case of a minimum value of an acceleration, which exceeds the value 0, a vehicle brake is activated at the position of the operator-controlled element assigned to the minimum value. In this way, for a released accelerator pedal and a correspondingly steep slope, for which the drag torque is no longer adequate to hold the instantaneous vehicle speed, a brake command of the driver can be detected and realized without an actuation of the brake pedal being required. In this way, the driving comfort is further increased.

It is especially advantageous when the brake force is so selected that the minimum value of the acceleration is reduced to approximately 0. In this way, the released accelerator pedal is interpreted such that the value 0 should be permitted as the smallest possible acceleration. In this way, the driving safety is especially increased in downhill stretches.

A further advantage is that the allocation of the minimum value and/or of the maximum value to the particular limit of the actuating range is carried out in dependence upon an instantaneous vehicle speed. In this way, for example for downhill stretches, the additional activation of the vehicle brake with the released accelerator pedal is initiated only when a pregiven vehicle speed is exceeded in order to free the driver from a continuous actuation of the accelerator pedal to reduce a braking effect. In this way, the driving comfort is, in turn, increased.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
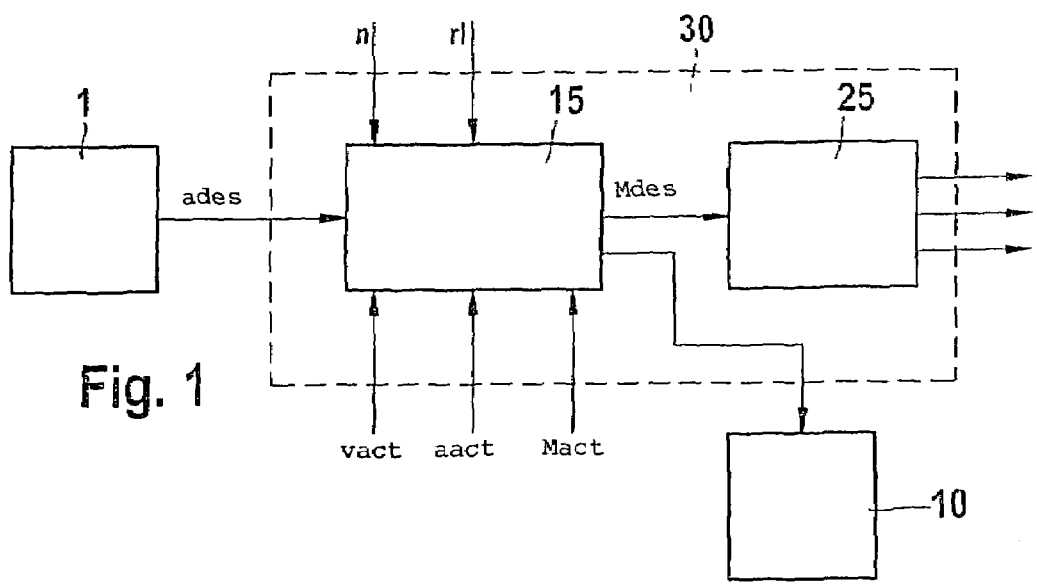
FIG. 1 shows a block circuit diagram with an arrangement according to the invention.

In FIG. 1, 30 identifies a motor control of a drive unit of a vehicle. The invention permits realization for any desired type of drive units. Therefore, the drive unit can, for example, include an electrodrive or an internal combustion engine. The internal combustion engine can, in turn, be, for example, a spark-ignition or a diesel engine. In the following, it will be assumed by way of example that the drive unit includes a gasoline engine. In FIG. 1, an engine control of the drive unit is identified by reference numeral 30. The engine control 30 includes means 15 for forming a desired value for an output quantity of the drive unit. The output quantity of the drive unit can, for example, be an engine output torque, a wheel torque, an engine power or the like. In the following, it will be assumed by way of example that the output quantity is a wheel torque. From detection means, which are not shown in FIG. 1 and are known to the person of skill, the following are supplied to the means 15: an instantaneous vehicle speed vact, which is characterized in the following also as actual speed; an instantaneous vehicle acceleration aact which is identified in the following also as actual acceleration; an instantaneous wheel torque mact, which is identified in the following as actual torque; an instantaneous engine rpm n and an instantaneous charge rl. The actual acceleration aact can also be determined from the supplied actual speed vact via derivation. Furthermore, the means 15 is connected to an operator-controlled element 1 which, for example, can be configured as an accelerator pedal and by which the driver of the vehicle can input an acceleration command in the sense of a desired acceleration ades via the position of the accelerator pedal. In the following, it is assumed by way of example that the operator-controlled element is an accelerator pedal. The subject matter of the invention is the conversion of the position of the accelerator pedal 1 into the desired acceleration ades. The means 15 determine a desired torque Mdes as desired value for the wheel torque from the pregiven desired acceleration ades in dependence upon the instantaneous operating point of the engine and the instantaneous drive situation, especially the actual acceleration aact. This desired torque Mdes is transmitted to the means 25 of the engine control 30 for forming at least an actuating quantity for the realization of the desired torque Mdes. In the case of the spark-ignition engine, for example, the following actuating quantities can be provided for realizing the desired torque Mdes: ignition time point, injection time point, injection quantity, air supply, air/fuel mixture. Furthermore, the means 15 can drive a vehicle brake 10.

According to the invention, a minimum value and/or a maximum value, is now determined for the acceleration of the vehicle with the minimum value and/or the maximum value being dependent upon the instantaneous running resistance. In the following, it will be assumed by way of example that the minimum value as well as the maximum value for the acceleration are determined. The computation of the minimum value and of the maximum value for the acceleration takes place as follows with the aid of a driving-dynamic equation:

$$ades * mfzg = FANdes - FWb - FWu \quad (1)$$

wherein mfzg is the vehicle mass;

FANdes is the desired drive force of the vehicle;

FWb is the known instantaneous running resistance; and,

FWu is the unknown instantaneous running resistance.

The known running resistance FWb results, for example, by the summation of the rolling friction FRO, the air resistance FL and the running resistance because of uphill travel FST as follows:

$$FWb = FRO + FL + FST \quad (2)$$

For the purpose of approaching the known running resistance FWb with the least possible computation complexity, only one of the above-mentioned running resistance forces FRO, FL, FST or a sum of less than all of the above-mentioned running resistance forces FRO, FL, FST can be formed. In the following, it will be assumed by way of example that the known running resistance FWb is formed according to equation (2). Here, the rolling friction FRO can be assumed as constant. The air resistance FL can be modeled as a function of the vehicle speed. The running resistance because of roadway slope FST can be measured, for example, by means of an acceleration sensor.

The vehicle mass mfzg in equation (1) can likewise, for example, be assumed as known from the vehicle data.

The unknown running resistance FWu can be adapted in the manner of equation (1) from the following relationship:

$$aact * mfzg = FANact - FWb - FWu \quad (3)$$

Here, the instantaneous drive force FANact, which, in the following, is also characterized as actual value of the drive force, is known from the wheel instantaneous torque Mact and the radius r of the drive wheels. The actual acceleration aact is given, for example, by the derivation of the actual speed vact. The following therefore results from equation (3):

$$FWu = FANact - FWb - aact * mfzg \quad (4)$$

For reasons of the dynamics, the right side of equation (4) can be filtered with a filter, for example, a lowpass filter of the first order T1, especially so that inaccuracies from the derivation of the actual speed vact cannot operate on the instantaneous unknown running resistance FWu. Therefore, the following results from equation (4) after lowpass filtering for the instantaneous unknown running resistance FWu:

$$FWu = T1\{FANact - FWb - aact * mfzg\} \quad (5)$$

Equation (5) can now be inserted into equation (1) so that the following results:

$$ades * mfzg = FANdes - FWb - T1\{FANact - FWb - aact * mfzg\} \quad (6)$$

From equation (6), the minimum value for the acceleration can now finally be computed in that the desired value of the drive force FANdes is replaced by the product of the instantaneous drag torque Mdrag and the inverted wheel radius r so that, for the minimum value alimitmin of the acceleration, the following results:

$$a\text{limitmin} = (M\text{drag}/r - FWb - T1\{FAN\text{act} - FWb - a\text{act}*mfzg\})/mfzg \qquad (7)$$

The instantaneous drag torque Mdrag can be determined in the means 15 from the following: the instantaneous engine rpm n and the charge rl based on a characteristic field in a manner known per se by the person of skill. The characteristic field is determined on a test stand. A maximum value alimitmax for the acceleration of the vehicle results in that, in equation (6), the desired value for the drive force FANdes is replaced by the product of an instantaneous maximum wheel torque Mengmax and the inverted wheel radius r so that the following results for the maximum value alimitmax of the acceleration:

$$a\text{limitmax} = (M\text{engmax}/r - FWb - T1\{FAN\text{act} - FWb - a\text{act}*mfzg\})/mfzg \qquad (8)$$

The instantaneous maximum wheel torque Mengmax can likewise be determined in a manner known per se to the person of skill from the maximum instantaneous charge rl and the instantaneous engine rpm n from a characteristic field determined on the test stand.

When the internal combustion engine is a diesel engine, then the determination of the instantaneous engine drag torque Mdrag and the instantaneous maximum wheel torque Mengmax takes place in a corresponding manner from respective characteristic fields whose input quantities are the instantaneous engine rpm (n) and the injection quantity. Correspondingly, for a diesel engine, a measured value for the instantaneous injection quantity must be supplied to the means 15 for the computation of FANact.

Figure 2:
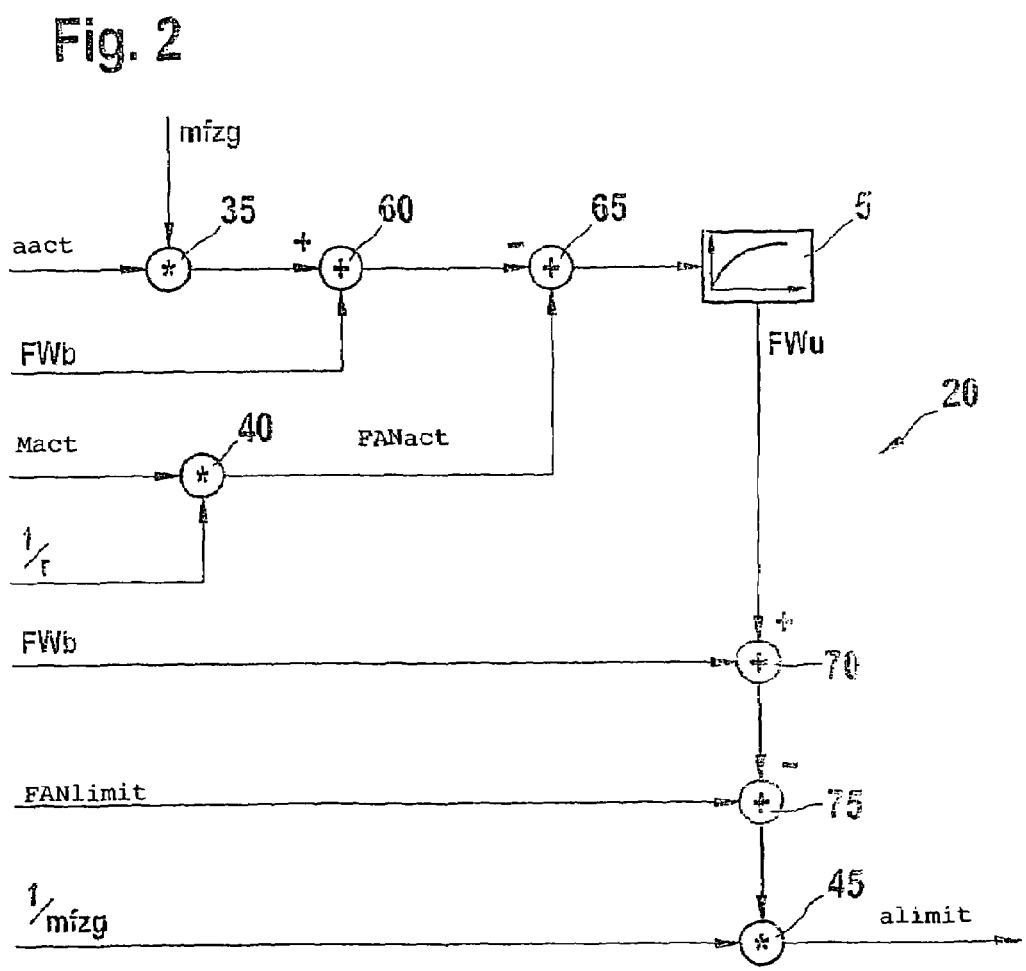
FIG. 2 shows a function diagram for describing the method of the invention and the configuration of the arrangement of the invention.

FIG. 2 shows a function diagram for the determination of the minimum value alimitmin and of the maximum value alimitmax for the acceleration of the vehicle. This function diagram describes the configuration of means 20 for determining the minimum value alimitmin and the maximum value alimitmax for the acceleration. The means 20 are part of the means 15 for forming the desired torque Mdes. The configuration of the means 20 is as follows.

The actual acceleration aact and the vehicle mass mfzg are supplied to a first multiplication member 35. In a first summation member 60, the product is added to the instantaneous known running resistance FWb which is determined in accordance with equation (2). After multiplication by −1, the sum is added to the actual value FANact of the drive force in a second summation member 65. The sum, which results therefrom, is supplied to the described lowpass which is identified in FIG. 2 by reference numeral 5 and, after filtering, is supplied to a third summation member 70 and is added to the instantaneous known running resistance FWb. After multiplication by −1, the resulting sum is added to a limit value FANlimit of the drive force in a fourth summation member 75. The sum which results is multiplied in a third multiplication member 45 by the inverse value of the vehicle mass mfzg. The resulting product is a limit value alimit for the acceleration of the vehicle. The actual value FANact of the drive force, which corresponds to the instantaneous drive force of the vehicle, results from multiplication of the actual torque Mact, which corresponds to the instantaneous wheel torque, by the inverted wheel radius r in a second multiplication member 40.

Figure 3:
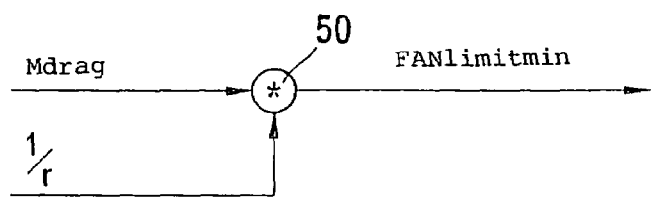
FIG. 3 shows a function diagram for determining a minimum value for the drive force.
Figure 4:
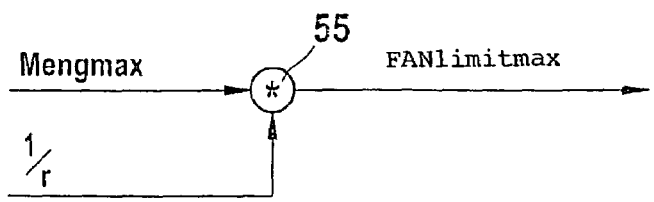
FIG. 4 shows a function diagram for determining a maximum drive force.

For determining the limit value FANlimit of the drive force, the arrangement 20 can switch over between a first function block of FIG. 3 and a second function block of FIG. 4 depending upon whether the determined limit value alimit for the acceleration should correspond to the minimum value alimitmin or the maximum value alimitmax for the acceleration. For determining the minimum value alimitmin for the acceleration, FIG. 3 shows a function diagram for determining the corresponding minimum limit value FANlimitmin of the drive force as a product of the instantaneous drag torque Mdrag and of the inverted wheel radius r computed by means of a fourth multiplication member 50.

The maximum value alimitmax for the acceleration results in accordance with the function diagram of FIG. 4 when the limit value FANlimit of the drive force is the maximum limit value FANlimitmax of the drive force which results by means of the fifth multiplication member 55 as a product of the instantaneous maximum wheel torque Mengmax and the inverted wheel radius r.

The function diagrams in FIGS. 2, 3 and 4 can be realized in accordance with software and/or with hardware.

Figure 5:
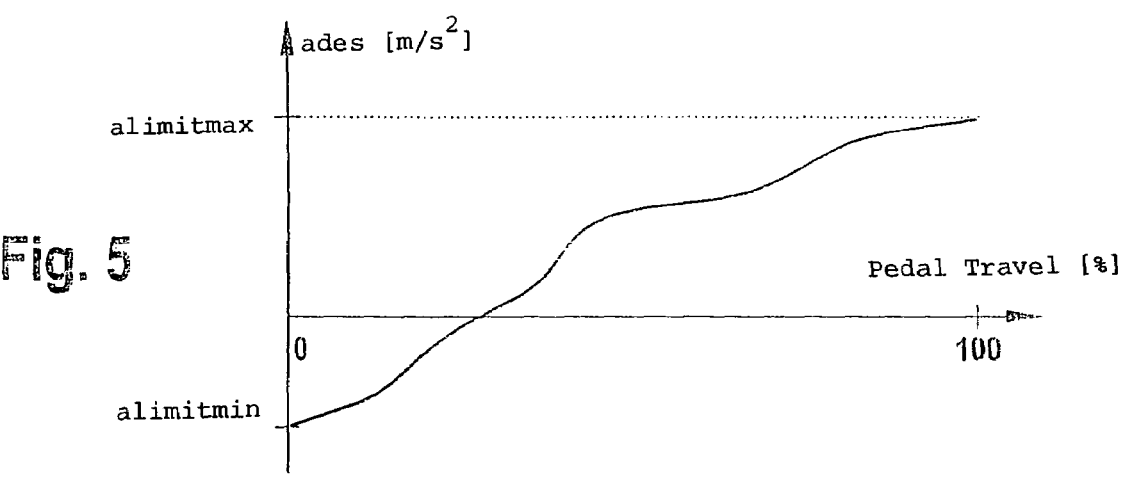
FIG. 5 shows a trace of a desired acceleration as a function of a pedal travel of an accelerator pedal in a first driving situation; and, FIG. 6 shows a trace of the desired acceleration as a function of the pedal travel in a second driving situation.
Figure 6:
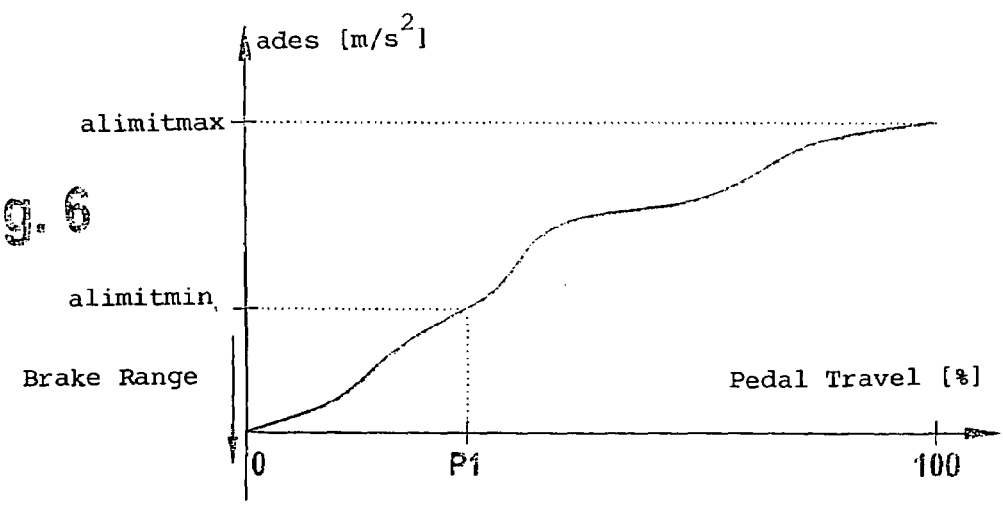

The minimum value alimitmin and the maximum value alimitmax are determined in the manner described for an instantaneous operating point of the vehicle and via the instantaneous known and unknown running resistances FWb, FWu. The minimum value alimitmin and the maximum value alimitmax for the acceleration of the vehicle are thereafter assigned to the limits of the position range for the position of the accelerator pedal 1. The minimum value alimitmin is assigned to the released accelerator pedal and the maximum value alimitmax is assigned to the fully depressed accelerator pedal or, stated otherwise, to the upper stop of the accelerator pedal 1. This is shown in FIG. 5 wherein the trace of the desired acceleration ades is plotted in m/s² as function of the pedal travel of the accelerator pedal 1 in percent. The desired acceleration ades as function of the pedal travel can be inputted as shown by way of example in FIG. 5 by suitable calibration between the minimum value alimitmin and the maximum value alimitmax. The course of the desired acceleration ades is nonlinear by way of example in accordance with FIG. 5 and increases strictly monotone. The course, however, could also run linearly interpolated from the minimum value alimitmin for a released accelerator pedal (that is, for a pedal travel=0%) up to the maximum value alimitmax for a fully depressed accelerator pedal (that is, a pedal travel=100%). The characteristic line in FIG. 5 is likewise formed in the means 15. A lost motion and a dead path are avoided in the interpretation of the acceleration command via the position of the accelerator pedal because of the assignment of the minimum value alimitmin to the pedal travel 0% and of the maximum value alimitmax to the pedal value 100% and to the strictly monotone slope of the desired acceleration ades between these two values. In the example of FIG. 5, the minimum value alimitmin is negative. For a corresponding intense drop in elevation, it can, however, happen that the instantaneous running resistance is so great in magnitude that the minimum value alimitmin exceeds the value 0, that is, that the drag torque Mdrag is no longer sufficient in order to hold the instantaneous driving speed vact. In this case, it can be provided that the means 15 activates the vehicle brake 10. The means 15 can so drive the vehicle brake 10 that a brake action results which inputs the value 0 as a desired value ades for the acceleration for a released accelerator pedal (that is, pedal travel 0%); that is, that no acceleration results for the released accelerator pedal. The braking action is then reduced with increasing pedal travel. The brake action goes back to 0 with the reaching of the minimum value alimitmin for the desired acceleration ades so that, for the assigned pedal position P1 according to FIG. 6, the means 15 can again deactivate the vehicle brake 10. FIG. 6 likewise shows the course of the desired acceleration ades in m/s$^2$ as a function of pedal value in percent with a positive minimum value alimitmin. The means 15 activate the vehicle brake 10 for desired accelerations ades below the minimum value alimitmin, that is, a braking range is present. In this way, the course of the desired acceleration ades increases strictly monotone in accordance with the example of FIG. 6 for a released accelerator pedal, that is, a pedal travel of 0% from 0 to the maximum value alimitmax for a fully depressed accelerator pedal, that is, pedal travel 100%. The reduction of the braking effect for activated vehicle brake 10 and increasing pedal value must take place in correspondence to the just then instantaneous course of the desired acceleration ades in the above-mentioned braking range as shown by way of example in FIG. 6 so that, for a corresponding pedal travel, the corresponding desired acceleration ades can be realized.

Furthermore, it can be optionally provided that the characteristic line for the desired acceleration ades is determined over the pedal travel in dependence upon the actual speed vact so that a family of characteristic curves can result in dependence upon the actual speed vact. For example, it can be provided that the braking action described with respect to FIG. 6 by activation of the vehicle brake 10 only takes place when a pregiven speed threshold is exceeded by the actual speed vact and therewith the limiting of the desired acceleration ades to 0 becomes effective for a released accelerator pedal and a positive minimum value alimitmin only for actual speed vact above the above-mentioned speed threshold. In this way, the driver of the vehicle is relieved from the continuous actuation of the accelerator pedal in downhill stretches in order to prevent a braking action.

A more comfortable driving is made possible because of the described interpretation of the pedal travel or of the accelerator pedal angle as desired acceleration ades without lost motion or dead path. This is so because running resistances need not be compensated by actuation of the accelerator pedal without leading to acceleration.

In the case of the speed dependency in the determination of the characteristic lines for the desired acceleration ades as a function of the pedal travel, different minimum values alimitmin and/or maximum values alimitmax for the acceleration result.

The minimum value alimitmin and the maximum value alimitmax are again and again adapted to the particular instantaneous operating point and the particular instantaneous driving situation or the particular instantaneous running resistance in the manner described during the driving operation so that it is ensured that, in the total driving operation, the lost motion and the dead path are avoided in the actuation of the acceleration pedal for inputting the desired acceleration ades.

The invention claimed is:

1. A method for controlling a drive unit of a vehicle, the method comprising the steps of:
    deriving an acceleration command from a position of an operator-controlled element;
    forming a desired value for an output quantity of the drive unit in dependence upon the acceleration command;
    determining at least one of a minimum value and a maximum value for the acceleration of the vehicle in dependence upon an instantaneous running resistance; and,
    assigning at least said one of said minimum value and said maximum value as respective limits of a position range for the position of the operator-controlled element.

2. The method of claim 1, comprising the further step of determining the running resistance in dependence upon at least one of the following: rolling friction, air resistance, a driving resistance because of uphill travel; and, inertial force.

3. The method of claim 1, wherein the assignment of the minimum value and/or the maximum value to the particular limit of the position range is carried out in dependence upon an instantaneous vehicle speed.

4. The method of claim 1, wherein said operator-controlled element is an accelerator pedal.

5. The method of claim 1, wherein said running resistance is a total running resistance.

6. An arrangement for controlling a drive unit of a motor vehicle, the arrangement comprising:
    means for deriving an acceleration command from a position of an operator-controlled element;
    means for forming a desired value for an output quantity of the drive unit in dependence upon the acceleration command;
    means for determining at least one of a minimum value and a maximum value for the acceleration of the vehicle in dependence upon an instantaneous running resistance; and,
    means for assigning at least said one of said minimum value and said maximum value as respective limits of a position range for the position of the operator-controlled element.

7. The arrangement of claim 6, wherein said operator-controlled element is an accelerator pedal.

8. The arrangement of claim 6, wherein said running resistance is a total running resistance.

9. A method for controlling a drive unit of a vehicle, the method comprising the steps of:
    deriving an acceleration command from a position of an operator-controlled element;
    forming a desired value for an output quantity of the drive unit in dependence upon the acceleration command;
    determining at least one of a minimum value and a maximum value for the acceleration of the vehicle in dependence upon an instantaneous running resistance;
    assigning at least said one of said minimum value and said maximum value as respective limits of a position range for the position of the operator-controlled element;
    determining the running resistance in dependence upon at least one of the following: rolling friction, air resistance, a driving resistance because of uphill travel; and, inertial force; and,
    deriving an unknown component of the running resistance with the aid of a vehicle-dynamic equation in dependence upon an instantaneous drive force of the vehicle, a known component of the running resistance and an instantaneous vehicle acceleration.

10. The method of claim 9, comprising the further step of filtering the unknown component of the running resistance.

11. The method of claim 10, wherein said filtering is carried out with a lowpass.

12. A method for controlling a drive unit of a vehicle, the method comprising the steps of:
    deriving an acceleration command from a position of an operator-controlled element;
    forming a desired value for an output quantity of the drive unit in dependence upon the acceleration command;

determining at least one of a minimum value and a maximum value for the acceleration of the vehicle in dependence upon an instantaneous running resistance;

assigning at least said one of said minimum value and said maximum value as respective limits of a position range for the position of the operator-controlled element; and, determining the minimum value of the acceleration from a drive force of the vehicle which is determined via an instantaneous drag torque less the instantaneous running resistance.

13. A method for controlling a drive unit of a vehicle, the method comprising the steps of:

deriving an acceleration command from a position of an operator-controlled element;

forming a desired value for an output quantity of the drive unit in dependence upon the acceleration command;

determining at least one of a minimum value and a maximum value for the acceleration of the vehicle in dependence upon an instantaneous running resistance;

assigning at least said one of said minimum value and said maximum value as respective limits of a position range for the position of the operator-controlled element; and, determining the maximum value of the acceleration from a maximum drive force which is determined by the instantaneous operating point of the vehicle less the instantaneous running resistance.

14. A method for controlling a drive unit of a vehicle, the method comprising the steps of:

deriving an acceleration command from a position of an operator-controlled element;

forming a desired value for an output quantity of the drive unit in dependence upon the acceleration command;

determining at least one of a minimum value and a maximum value for the acceleration of the vehicle in dependence upon an instantaneous running resistance;

assigning at least said one of said minimum value and said maximum value as respective limits of a position range for the position of the operator-controlled element; and, activating a vehicle brake when there is a minimum value of the acceleration exceeding the value zero for the position of the operator-controlled element corresponding to the minimum value.

15. The method of claim 14, wherein the brake force is so selected that the minimum value of the acceleration is reduced approximately to zero.

* * * * *